(12) United States Patent
Ohdou et al.

(10) Patent No.: US 10,189,724 B2
(45) Date of Patent: Jan. 29, 2019

(54) WATER TREATMENT DEVICE (71) Applicant: DAIKIN INDUSTRIES, LTD., Osaka-shi, Osaka (JP)

(72) Inventors: Tsunahiro Ohdou, Osaka (JP); Masaya Nishimura, Osaka (JP); Tomoki Saitou, Osaka (JP); Sachiko Yamaguchi, Osaka (JP)

(73) Assignee: DAIKIN INDUSTRIES, LTD., Osaka-Shi (JP)

( * ) Notice: Subject to any disclaimer, the term of this patent is extended or adjusted under 35 U.S.C. 154(b) by 0 days.

(21) Appl. No.: 15/539,525

(22) PCT Filed: Dec. 24, 2015

(86) PCT No.: PCT/JP2015/006463
§ 371 (c)(1),
(2) Date: Jun. 23, 2017

(87) PCT Pub. No.: WO2016/103723
PCT Pub. Date: Jun. 30, 2016

(65) Prior Publication Data
US 2017/0349456 A1    Dec. 7, 2017

(30) Foreign Application Priority Data
Dec. 26, 2014  (JP) .................................. 2014-265971

(51) Int. Cl.
*C02F 1/00* (2006.01)
*C02F 1/46* (2006.01)
(Continued)

(52) U.S. Cl.
CPC ............ *C02F 1/4608* (2013.01); *C01B 13/11* (2013.01); *C02F 1/001* (2013.01); *F24F 3/16* (2013.01);
(Continued)

(58) Field of Classification Search
None
See application file for complete search history.

(56) References Cited

U.S. PATENT DOCUMENTS

| 6,555,011 B1 * | 4/2003 | Tribelsky ................. A61L 2/08 204/158.2 |
| 2012/0048792 A1 | 3/2012 | Saitou et al. |
| 2015/0251935 A1 | 9/2015 | Nishimura et al. |

FOREIGN PATENT DOCUMENTS

| JP | 2011-158142 A | 8/2011 |
| JP | 2014-79733 A | 5/2014 |

(Continued)

OTHER PUBLICATIONS

International Search Report, issued in PCT/JP2015/006463, PCT/ISA/237, dated Mar. 15, 2016.
(Continued)

*Primary Examiner* — Krishnan S Menon
(74) *Attorney, Agent, or Firm* — Birch, Stewart, Kolasch & Birch, LLP (57) ABSTRACT

A water treatment vessel (10) causes electric discharge in water stored therein to produce a sterilizing factor. The water treatment vessel (10) moves in accordance with the level of water in a reservoir (30) to be switched between a discharging state where the water treatment vessel (10) and the reservoir (30) have no communication, and a pair of electrodes (16, 17) are immersed in water in the water treatment vessel (10) to cause the electric discharge, and a draining state where the pair of electrodes (16, 17) come out of water in the water treatment vessel (10) to stop the electric discharge, and water flows out of the water treatment vessel (10) into the reservoir (30). The water supplier (20) supplies water to the water treatment vessel (10) in the draining state, and stop the supply of water to the water treatment vessel (10) in the discharging state.

12 Claims, 6 Drawing Sheets

(51) Int. Cl.
  *C02F 9/00*  (2006.01)
  *F24F 3/16*  (2006.01)
  *F24F 6/00*  (2006.01)
  *F24F 6/02*  (2006.01)
  *F24F 6/06*  (2006.01)
  *C01B 13/11* (2006.01)

(52) U.S. Cl.
  CPC .................. *F24F 6/02* (2013.01); *F24F 6/06* (2013.01); *C02F 9/00* (2013.01); *C02F 2303/04* (2013.01); *C02F 2305/023* (2013.01); *F24F 2006/008* (2013.01)

(56) References Cited

FOREIGN PATENT DOCUMENTS

WO  WO 2010/131429 A1  11/2010
WO  WO 2014/050079 A1  4/2014

OTHER PUBLICATIONS

The Decision to Grant a Patent has been received for JP 2014-265971 dated Mar. 8, 2016.

* cited by examiner

WATER TREATMENT DEVICE

TECHNICAL FIELD

The present invention relates to a water treatment device, and more particularly relates to an insulating structure of a water treatment device.

BACKGROUND ART

A water treatment device which causes electric discharge in water stored in a treatment vessel to purify the water has been known.

For example, Patent Document 1 discloses a water treatment device including a water treatment unit which causes electric discharge in water in a treatment vessel to produce a sterilizing factor in the water, and insulators respectively provided adjacent to an inlet and outlet of the water treatment unit to electrically insulate the water treatment unit and water flowing through the water treatment unit from each other. According to Patent Document 1, the insulators are respectively provided adjacent to the inlet and outlet of the water treatment unit. Thus, no current flows from the water treatment unit to water flowing through the water treatment unit. As a result, supplied power is used efficiently.

CITATION LIST

Patent Document

Patent Document 1: Japanese Unexamined Patent Publication No. 2014-79733

SUMMARY OF THE INVENTION

Technical Problem

An air purifier having a humidifying function includes a humidification rotor which humidifies the air, and a reservoir which houses a lower portion of the humidification rotor and stores water for vaporization. Purification of water in the reservoir of the air purifier of such a configuration has been proposed. According to the water treatment device disclosed by Patent Document 1, the insulator adjacent to the inlet is configured to spray water, and the insulator adjacent to the outlet is configured to drip water. This increases the size of the insulators respectively adjacent to the inlet and the outlet. Therefore, it is not easy for the air purifier placed inside a room to house the water treatment device as disclosed by Patent Document 1.

In view of the foregoing background, it is therefore an object of the present invention to downsize insulating structures respectively provided adjacent to an inlet and outlet of a water treatment vessel which causes electric discharge in water.

Solution to the Problem

To achieve the above-described object, an aspect of the present disclosure is directed to a configuration in which a water treatment vessel (10) moves in accordance with the level of water in a reservoir (30) so that the water treatment vessel (10) is switched between a discharging state where the supply of water to the water treatment vessel (10) is stopped and a draining state where water is supplied to the water treatment vessel (10).

According to a first aspect of the present disclosure, a water treatment device includes: a water treatment vessel (10) which causes electric discharge in water stored therein to produce a sterilizing factor; a water supplier (20) which supplies water to the water treatment vessel (10); a reservoir (30) which stores water supplied from the water treatment vessel (10); and a pair of electrodes (16, 17) which cause the electric discharge in the water treatment vessel (10), wherein the water treatment device (10) is configured to move in accordance with the level of the water stored in the reservoir (30) so that the water treatment vessel (10) is switched between a discharging state where the water treatment vessel (10) and the reservoir (30) have no communication, and the pair of electrodes (16, 17) are immersed in the water in the water treatment vessel (10) to cause the electric discharge, and a draining state where the pair of electrodes (16, 17) come out of the water in the water treatment vessel (10) to stop the electric discharge, and the water flows out of the water treatment vessel (10) into the reservoir (30), and the water supplier (20) is configured to supply water to the water treatment vessel (10) while the water treatment vessel (10) is in the draining state, and stops the supply of water while the water treatment vessel (10) is in the discharging state.

According to the first aspect of the present disclosure, the water treatment vessel (10) is configured to move in accordance with the level of water stored in the reservoir (30) so that the water treatment vessel (10) is switched between the discharging state where the electric discharge occurs in water, and the draining state where the electric discharge does not occur.

While the water treatment vessel (10) is in the discharging state, the water treatment vessel (10) and the reservoir (30) have no communication, and the pair of electrodes (16, 17) are immersed in the water in the water treatment vessel (10) to cause the electric discharge in the water. While the water treatment vessel (10) is in the discharging state, the water treatment vessel (10) and the reservoir (30) have no communication. Thus, water in the water treatment vessel (10) and water in the reservoir (30) are electrically insulated from each other, and thus no current flows from the water in the water treatment vessel (10) to the water in the reservoir (30).

Further, while the water treatment vessel (10) is in the draining state, the pair of electrodes (16, 17) come out of the water in the water treatment vessel (10) to stop the electrical discharge in the water, and the water flows out of the water treatment vessel (10) to the reservoir (30). While the water treatment vessel (10) is in the draining state, the water flows out of the water treatment vessel (10) to the reservoir (30), thereby bringing the water in the water treatment vessel (10) and the water in the reservoir (30) into conduction. However, no current flows from the water in the water treatment vessel (10) to the water in the reservoir (30) because the electrical discharge in the water in the water treatment vessel (10) has been stopped.

As can be seen, according to the first aspect of the present disclosure, the insulating structure adjacent to the outlet of the water treatment vessel (10) functions in any of the discharging and draining states of the water treatment vessel (10), and is downsized as compared with a generally known insulating structure which drips water, for example.

According to the first aspect, the water supplier (20) is configured to supply water to the water treatment vessel (10) while the water treatment vessel (10) is in the draining state, and stop the supply of water while the water treatment vessel (10) is in the discharging state.

While the water treatment vessel (10) is in the discharging state, the water supplier (20) stops the supply of water to the water treatment vessel (10). Thus, water in the water treatment vessel (10) and water in the water supplier (20) are electrically insulated from each other, and no current flows from the water in the water treatment vessel (10) to the water in the water supplier (20).

While the water treatment vessel (10) is in the draining state, the water supplier (20) supplies water to the water treatment vessel (10), thereby bringing the water in the water treatment vessel (10) and the water in the water supplier (20) into conduction. However, no current flows from the water in the water treatment vessel (10) to the water in the water supplier (20) because the electric discharge in the water in the water treatment vessel (10) has been stopped.

As can be seen, according to the first aspect, the insulating structure adjacent to the inlet of the water treatment vessel (10) functions in any of the discharging and draining states of the water treatment vessel (10), and is downsized as compared with a generally known insulating structure which sprays water, for example.

According to the first aspect, the insulating structures adjacent to the inlet and outlet of the water treatment vessel (10) are reduced in size as compared with those of the above-described generally known water treatment device. This may downsize insulating structures adjacent to an inlet and outlet of a water treatment device which causes electric discharge in water.

A second aspect of the present disclosure is an embodiment of the first aspect of the disclosure. According to the second aspect, the water treatment vessel (10) is supported to be rotatable about a rotational shaft (S) parallel to a horizontal plane in the reservoir (30), and the water treatment vessel (10) is configured to rotate in accordance with the level of water in the reservoir (30) so as to be switched between the discharging and draining states.

According to the second aspect, the water treatment vessel (10) is supported to be rotatable about the rotational shaft (S) parallel to the horizontal plane in the reservoir (30). Further, the water treatment vessel (10) is configured to rotate in accordance with the level of water stored in the reservoir (30) so as to be switched between the discharging and draining states. Specifically, the water treatment vessel (10) rotates about the rotational shaft (S) in the reservoir (30) to be switched between the discharging and draining states. Thus, the water treatment vessel (10) may be placed at a lower level as compared with the case, for example, where a generally known insulating structure which drips water is adopted.

A third aspect of the present disclosure is an embodiment of the second aspect of the disclosure. According to the third aspect, the water treatment vessel (10) includes a divider (11) which is made of an electrically insulating material, and divides a space in the water treatment vessel (10) into a portion in which one (16) of the pair of electrodes (16, 17) is immersed in water, and a portion in which the other (17) of the pair of electrodes (16, 17) is immersed in water. The divider (11) has a through hole (12h) which forms a current path between the pair of electrodes (16, 17) and causes the electric discharge. The divider (11) is orthogonal to the rotational shaft (S) of the water treatment vessel (10).

According to the third aspect, the water treatment vessel (10) includes the divider (11) which is made of an electrically insulating material, and functions as a partition between the pair of electrodes (16, 17) immersed in water stored in the water treatment vessel (10). The divider (11) has a through hole (12h) which forms a current path between the pair of electrodes (16, 17) while the water treatment vessel (10) is in the discharging state. The divider (11) is orthogonal to the rotational shaft (S) of the water treatment vessel (10). Thus, when the water treatment vessel (10) rotates about the rotational shaft (S) orthogonal to the divider (11), the pair of electrodes (16, 17) arranged to sandwich the divider (11) are immersed in water stored in the water treatment vessel (10), thereby switching the water treatment vessel (10) to the discharging state.

While the water treatment vessel (10) is in the discharging state, a bubble is formed in water stored in the water treatment vessel (10), more specifically, in the through hole (12h) penetrating the divider (11) to serve as the current path between the pair of electrodes (16) and (17), and electric discharge occurs in the bubble. As a result, a sterilizing factor, such as hydroxyl radicals, may be produced in the water stored in the water treatment vessel (10).

Further, according to the third aspect, the divider (11) is orthogonal to the rotational shaft (S). Thus, the water treatment vessel (10), when tilted during the draining state, allows water to flow out of both of the portions of the water treatment vessel (10) divided by the divider (11).

A fourth aspect of the present disclosure is an embodiment of the second or third aspect of the present disclosure. According to the fourth aspect, the water supplier (20) includes a valve mechanism (25) which is coupled to the water treatment vessel (10), is closed during the discharging state, and is opened during the draining state.

According to the fourth aspect, the water supplier (20) includes the valve mechanism (25) coupled to the water treatment vessel (10) that rotates in the reservoir (30). The valve mechanism (25) is configured to be closed while the water treatment vessel (10) is in the discharging state, and opened while the water treatment vessel (10) is in the draining state, in accordance with the rotation of the water treatment vessel (10).

While the water treatment vessel (10) is in the discharging state, the valve mechanism (25) stops the supply of water from the water supplier (20) to the water treatment vessel (10). Thus, water in the water treatment vessel (10) and water in the water supplier (20) are electrically insulated from each other, and no current flows from the water in the water treatment vessel (10) to the water in the water supplier (20).

Further, while the water treatment vessel (10) is in the draining state, the valve mechanism (25) allows the water supplier (20) to supply water to the water treatment vessel (10), thereby bringing the water in the water treatment vessel (10) and the water in the water supplier (20) into conduction. However, no current flows from the water in the water treatment vessel (10) to the water in the reservoir (30) because the electric discharge in the water in the water treatment vessel (10) has been stopped.

Thus, the insulating structure adjacent to the inlet of the water treatment vessel (10) is comprised of the valve mechanism (25) of the water supplier (20). This may downsize the insulating structure as compared with a generally known insulating structure which sprays water, for example.

A fifth aspect of the present disclosure is an embodiment of the second or third aspects of the present disclosure. According to the fifth aspect, the water treatment vessel (10) is configured to be switched to the draining state if the level of the water stored in the reservoir (30) is equal to or less than a predetermined value, and tilted in the draining state such that the water flows out of the water treatment vessel (10) over an edge thereof into the reservoir (30).

According to the fifth aspect, the water treatment vessel (10) that rotates in the reservoir (30) is tilted and switched to the draining state if the level of the water stored in the reservoir (30) is equal to or less than the predetermined value. Thus, while the water treatment vessel (10) is in the draining state, the water flows out of the water treatment vessel (10) over an edge thereof into the reservoir (30). As a result, the water in the water treatment vessel (10) and the water in the reservoir (30) are brought into conduction. However, no current flows from the water in the water treatment vessel (10) to the water in the reservoir (30) because the discharge in the water in the water treatment vessel (10) has been stopped.

If the level of the water stored in the reservoir (30) exceeds the predetermined value and the amount of tilt of the water treatment vessel (10) is reduced, the water treatment vessel (10) is switched to the discharging state. During this discharging state, the water stored in the water treatment vessel (10) does not flow into the reservoir (30), and the water treatment vessel (10) and the reservoir (30) have no communication. Thus, the water in the water treatment vessel (10) and the water in the reservoir (30) are electrically insulated from each other. Therefore, during the discharging state, no current flows from the water in the water treatment vessel (10) to the water in the reservoir (30).

Thus, according to the fifth aspect, the insulating structure adjacent to the outlet of the water treatment vessel (10) is comprised of the water treatment vessel (10) which rotates in the reservoir (30). This may downsize the insulating structure as compared with a generally known insulating structure which drips water, for example.

A sixth aspect of the present disclosure is an embodiment of any one of the second to fifth aspects of the present disclosure. According to the sixth aspect, a wall surface of the water treatment vessel (10), over which the water flows out of the water treatment vessel (10), is tilted so that an upper end of the wall surface is located further toward the outside than a lower end thereof.

According to the sixth aspect, the wall surface of the water treatment vessel (10), over which the water flows out of the water treatment vessel (10), is tilted so that an upper end of the wall surface is located further toward the outside than a lower end thereof. Thus, the water flows over a portion of the water treatment vessel (10) having the shape of the bow of a boat as viewed from the side (as viewed in the direction of the rotational shaft (S)). As a result, the water may be well drained, and an insulation distance between the surface of the water in the reservoir (30) and the surface of the water in the water treatment vessel (10) may be ensured. Further, if water is stored in the reservoir (30), a buoyant force acts on the water treatment vessel (10) to float the bow-shaped portion of the water treatment vessel (10). This allows the water treatment vessel (10) to rotate in the reservoir (30).

Advantages of the Invention

According to the aspect of the present disclosure, the water treatment vessel (10) moves in accordance with the level of water in the reservoir (30) so that the water treatment vessel (10) is switched between the discharging state where the supply of water to the water treatment vessel (10) is stopped, and the draining state where water is supplied to the water treatment vessel (10). This may downsize the insulating structures respectively arranged adjacent to the inlet and outlet of the water treatment vessel (10) which causes electric discharge in water.

DESCRIPTION OF EMBODIMENTS

Embodiments of the present invention will now be described in detail with reference to the drawings. Note that the present invention is not limited to the following embodiments.

First Embodiment

FIGS. 1-6 illustrate an embodiment of a water treatment device. In the present embodiment, an air purifier having a humidifying function will be described as an example of the water treatment device.

Figure 1:
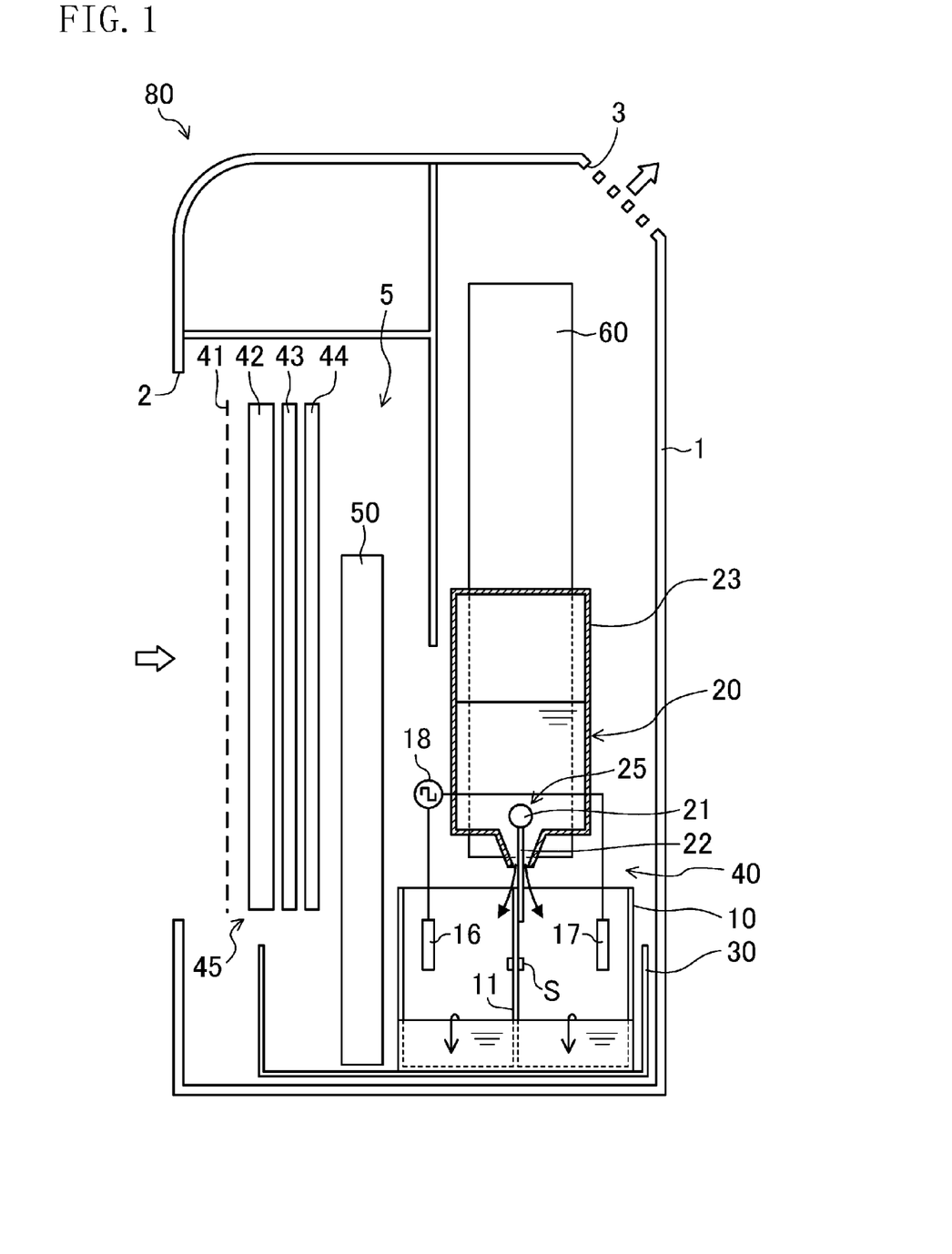
FIG. 1 is a schematic diagram illustrating an internal configuration of an air purifier according to a first embodiment.

The air purifier (80) includes, as shown in FIG. 1, a casing (1) which is made of a resin, and houses an air purification unit (45), a humidification rotor (50), a water treatment unit (40), and a fan (60).

<Casing>

The casing (1) has the shape of a rectangular parallelepiped box. As shown in FIG. 1, the casing (1) has an inlet (2) formed through a front surface thereof (a left surface in FIG. 1) through which the air is introduced into the casing (1). The casing (1) also has an outlet (3) formed through a rear portion of a top surface thereof as shown in FIG. 1, through which the air in the casing (1) is blown to the inside of a room.

An air passage (5) is formed inside the casing (1) as shown in FIG. 1 to allow the air to flow from the inlet (2) to the outlet (3). As shown in FIG. 1, the air purification unit (45), the humidification rotor (50), the water treatment unit (40), and the fan (60) are sequentially arranged in the air passage (5) in the direction of the air flow in the air passage (5). A front panel (not shown) is attached to the front surface (left surface in FIG. 1) of the casing (1).

<Air Purification Unit>

The air purification unit (45) includes a prefilter (41), an ionizer (42), an electrostatic filter (43), and a deodorizing filter (44) which are sequentially arranged in the direction of the air flow as shown in FIG. 1, and is configured to purify the air flowing through the air passage (5).

The prefilter (41) is configured to trap relatively large dust particles in the air sucked through the inlet of the air passage (5).

The ionizer (42) is configured to allow relatively small dust particles in the air that has passed through the prefilter (41) to be positively charged, for example. Further, the ionizer (42) includes a linear electrode and a plate electrode facing each other, for example, and is configured to apply a voltage to the linear and plate electrodes to cause corona discharge between the linear and plate electrodes.

The electrostatic filter (43) is configured to electrically attract and trap the dust particles charged by the ionizer (42).

The deodorizing filter (44) supports a deodorant for deodorization of the air on a surface of a honeycomb base material. The deodorant may be an adsorbent which adsorbs target components (odor and toxic substances) in the air, a catalyst which oxidatively decomposes the target components, or any other suitable material.

<Water Treatment Unit>

The water treatment unit (40) includes, as shown in FIG. 1, a reservoir (30) placed on the bottom of the casing (1), a water treatment vessel (10) provided in the reservoir (30), a first electrode (16) and a second electrode (17) which are fixed in the casing (1), and a water supplier (20) arranged above the water treatment vessel (10). FIG. 1 shows the water treatment unit (40) in the state shown in FIG. 4 as viewed from the left in FIG. 4.

~Reservoir~

The reservoir (30) is configured to store water supplied from the water supplier (10). The reservoir (30) is configured to be placed in, and removed from, the casing (1) from the side surface of the casing (1) (in the direction perpendicular to the paper of FIG. 1).

~Water Treatment Vessel~

Figure 4:
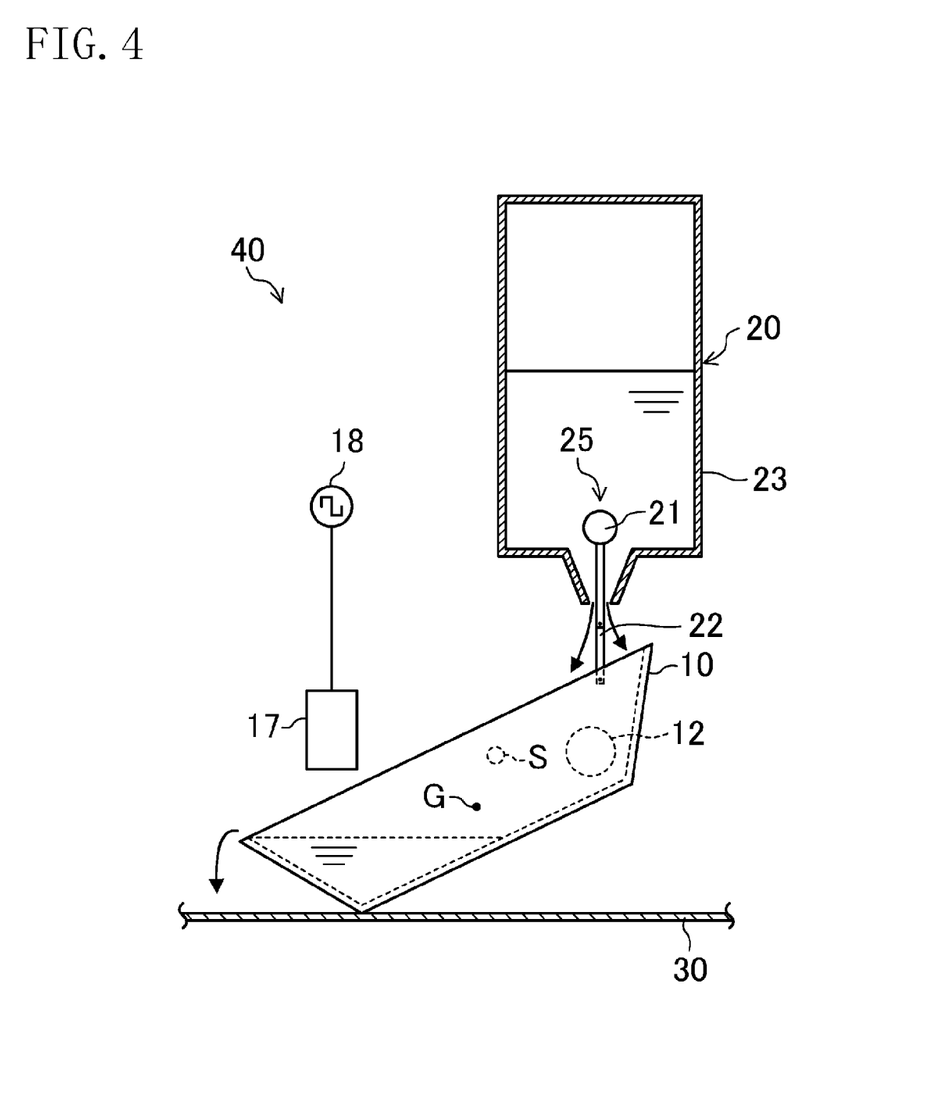
FIG. 4 is a schematic view illustrating the water treatment vessel forming part of the air purifier according to the first embodiment in a first draining state.
Figure 5:
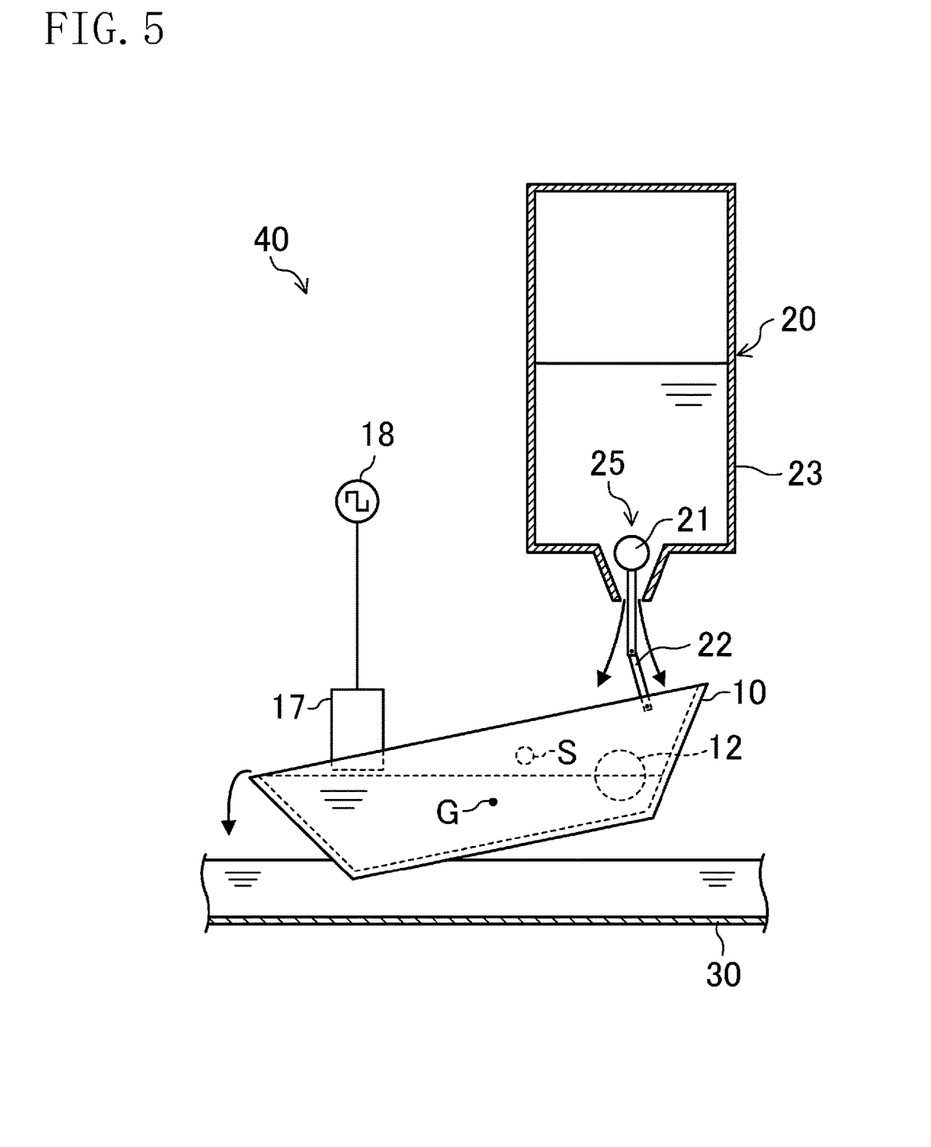
FIG. 5 is a schematic view illustrating the water treatment vessel forming part of the air purifier according to the first embodiment in a second draining state.
Figure 6:
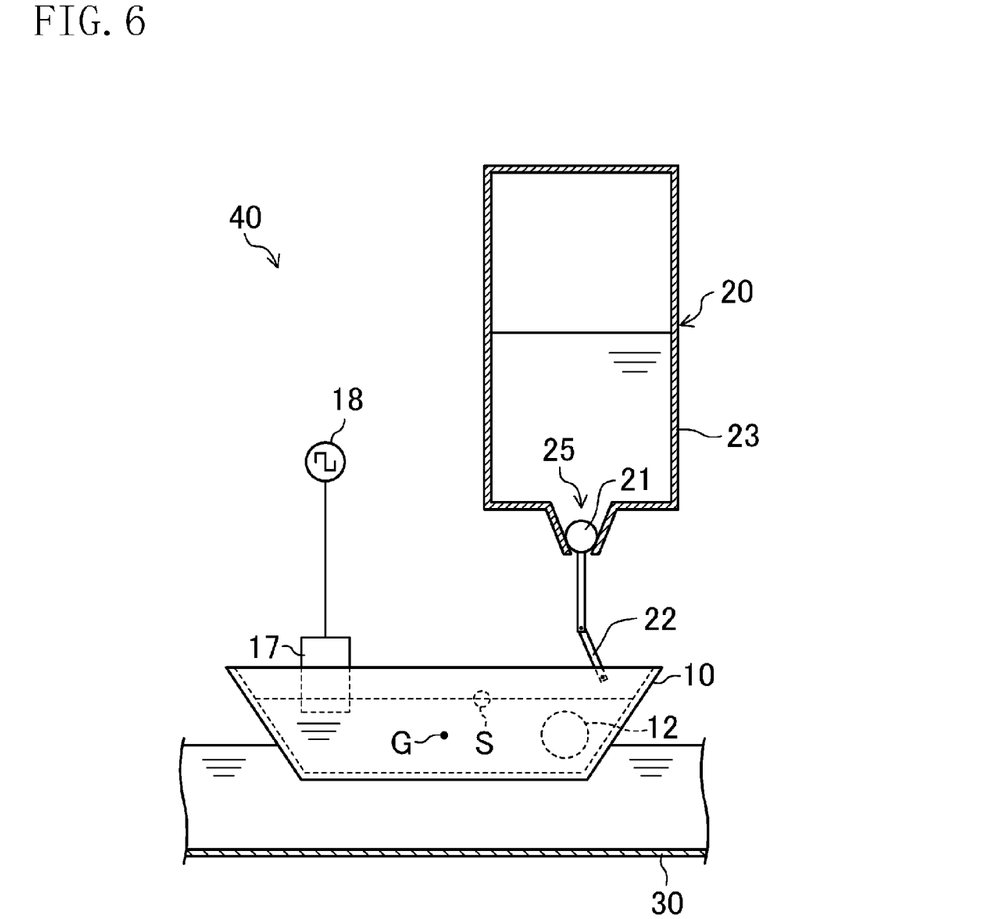
FIG. 6 is a schematic view illustrating the water treatment vessel forming part of the air purifier according to the first embodiment in a discharging state.

The water treatment vessel (10) is configured to cause electric discharge in water stored therein to produce a sterilizing factor. The water treatment vessel (10) is a box-shaped water tank having the shape of a boat when viewed from the side as shown in FIGS. 4-6. The water treatment vessel (10) is supported by the reservoir (30) so that the water treatment vessel (10) is rotatable about a rotational shaft (S) parallel to the horizontal plane in the reservoir (30) as shown in FIGS. 4-6. Further, the water treatment vessel (10) is configured to rotate in accordance with the level of water stored in the reservoir (30) so that the water treatment vessel (10) is switched between a discharging state shown in FIG. 6 and a draining state shown in FIGS. 4 and 5.

While the water treatment vessel (10) is in the discharging state, the water treatment vessel (10) and the reservoir (30) have no communication as shown in FIG. 6, and the first and second electrodes (16) and (17) are immersed in water stored in the water treatment vessel (10) to cause electric discharge in the water. While the water treatment vessel (10) is in the draining state, the first and second electrodes (16) and (17) come out of water stored in the water treatment vessel (10) to stop the discharge in the water, and the water flows out of the water treatment vessel (10) into the reservoir (30).

The water treatment vessel (10) is configured to be switched to the draining state if the level of water stored in the reservoir (30) is equal to or less than a predetermined value, and tilted in the draining state such that the water flows out of the water treatment vessel (10) over an edge thereof into the reservoir (30).

The rotational shaft (S) of the water treatment vessel (10) is misaligned from the center of gravity (G) of the water treatment vessel (10). Specifically, the rotational shaft (S) of the water treatment vessel (10) is located above the center of gravity (G) of the water treatment vessel (10). Further, the rotational shaft (S) of the water treatment vessel (10) is arranged opposite to the first and second electrodes (16) and (17) relative to the center of gravity (G) of the water treatment vessel (10).

The water treatment vessel (10) includes a divider (11) which divides a space in the water treatment vessel (10) into a portion in which the first electrode (16) is immersed in water, and a portion in which the second electrode (17) is immersed in water. The water treatment vessel (10) including the divider (11) is made of an electrically insulating material. A disc-shaped discharging member (12) made of an electrically insulating material, such as ceramics or any other suitable material, is fitted in the divider (11) as shown in FIG. 2.

Figure 2:
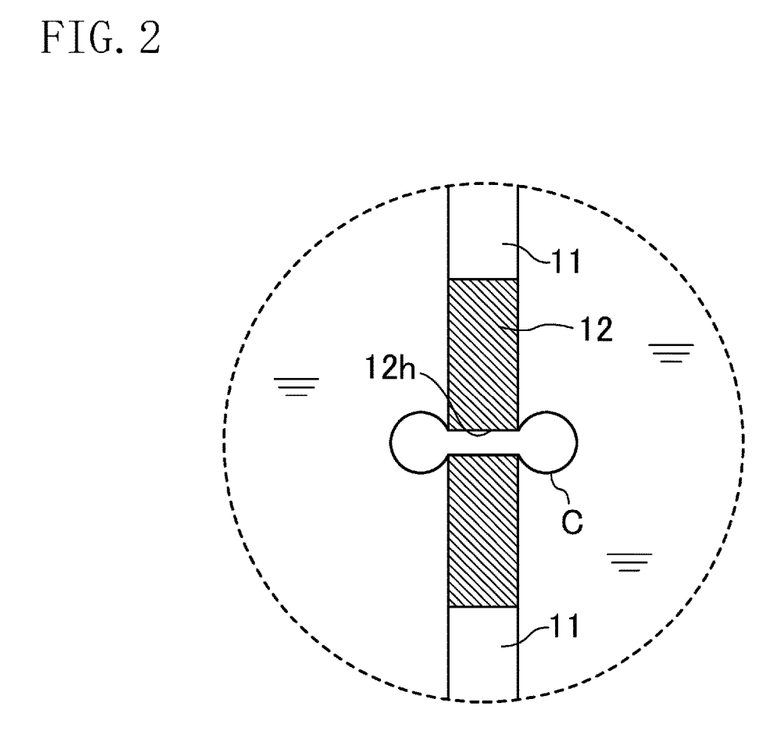
FIG. 2 is a schematic view illustrating a major part of a divider of a water treatment vessel forming part of the air purifier according to the first embodiment.

As shown in FIG. 2, the discharging member (12) has a minute through hole (12h) having a diameter of about 50 μm, for example, which forms a current path between the first and second electrodes (16) and (17). The through hole (12h) is arranged to be always below the surface of water stored in the water treatment vessel (10) during the discharging state in which the first and second electrodes (16) and (17) are immersed in the water stored in the water treatment vessel (10). Further, the rotational shaft (S) penetrates the divider (11) as shown in FIG. 1. The divider (11) may be taller than the sidewalls of the water treatment vessel (10).

~Electrodes~

The first and second electrodes (16) and (17) respectively have the shape of a flat plate, and are arranged to face each other. The first and second electrodes (16) and (17) are made of, for example, a metallic material which is highly resistant to corrosion. The first and second electrodes (16) and (17) are connected to a high voltage generator (18) as shown in FIG. 1. The high voltage generator (18) is comprised of a power source which applies a predetermined voltage to the first and second electrodes (16) and (17). Further, the high voltage generator (18) is configured to apply a voltage having a waveform alternating between positive and negative, for example, to the first and second electrodes (16) and (17).

~Water Supplier~

The water supplier (20) is configured to supply water to the water treatment vessel (10). As shown in FIG. 1, the water supplier (20) includes a water tank (23) which stores tap water, and a valve mechanism (25) provided at the bottom of the water tank (23). Further, the water supplier (20) is configured to supply water to the water treatment vessel (10) while the water treatment vessel (10) is in the draining state, and stop the supply of water while the water treatment vessel (10) is in the discharging state, depending on the state of the valve mechanism (25).

The water tank (23) is configured to be placed in, and removed from, the casing (1) from the side surface of the casing (1) (in the direction perpendicular to the paper of FIG. 1). Specifically, the water tank (23) is detachably housed in the casing (1). The bottom of the water tank (23) has a conical portion having a diameter gradually decreasing toward an outlet as shown in FIGS. 1, and 4-6.

Figure 3:
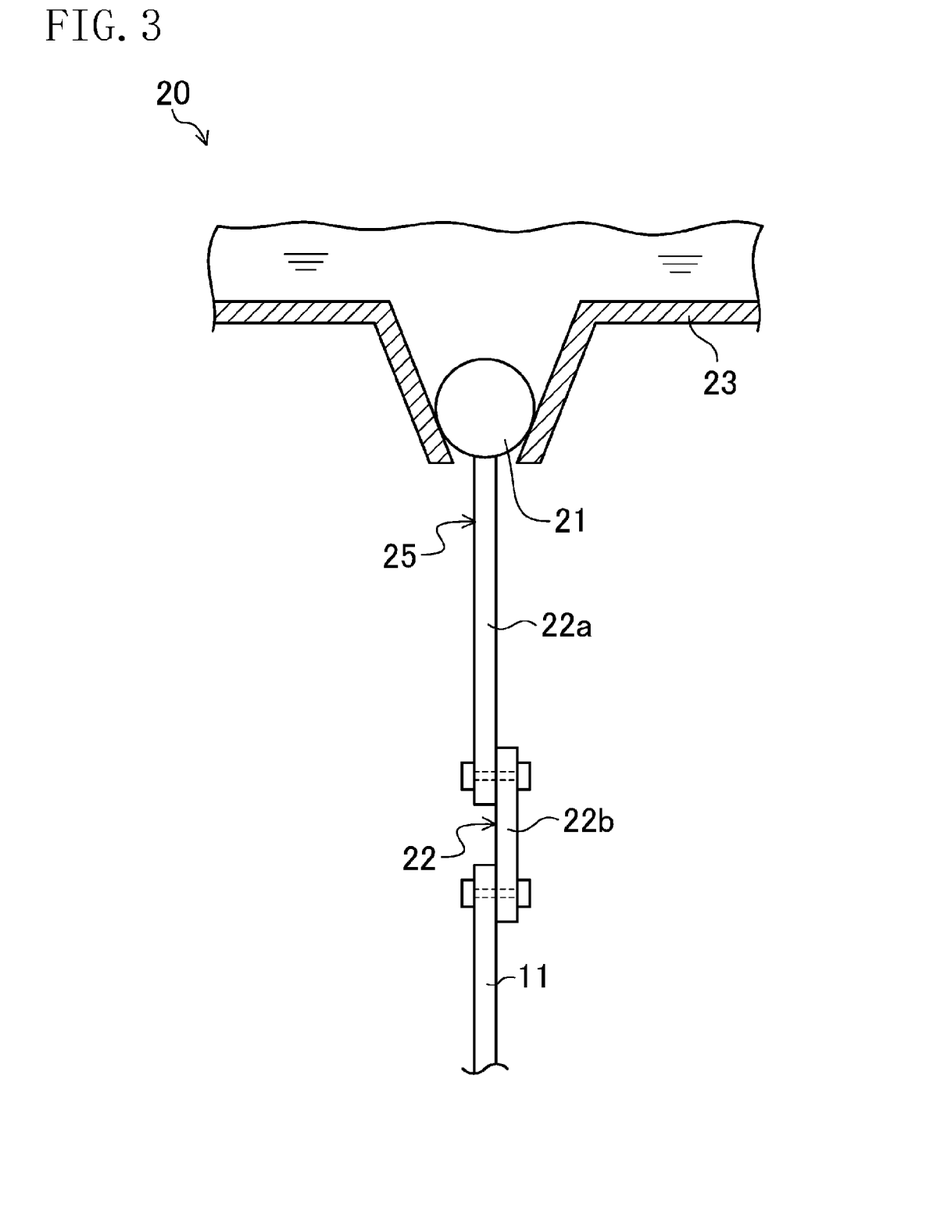
FIG. 3 is a schematic view illustrating a valve mechanism of a water supplier forming part of the air purifier according to the first embodiment.

The valve mechanism (25) is configured to be closed while the water treatment vessel (10) is in the discharging state, and opened while the water treatment vessel (10) is in the draining state. The valve mechanism (25) includes a spherical plug member (21) housed in the bottom of the water tank (23), and a water supply control rod (22) which displaces the plug member (21) at the bottom of the water tank (23) as shown in FIGS. 1, and 4-6. The water supply control rod (22) includes, as shown in FIG. 3, a push-up member (22a) which moves vertically to come into contact with the plug member (21), and a coupling member (22b) which is rotatably coupled with the push-up member (22a) and the divider (11).

The valve mechanism (25) is configured to move the push-up member (22a) downward to block the outlet of the water tank (23) with the plug member (21) as shown in FIG. 6 while the water treatment vessel (10) is in the discharging state, and move the push-up member (22a) upward to open the outlet of the water tank (23) as shown in FIGS. 4 and 5 while the water treatment vessel (10) is in the draining state. When the water tank (23) is removed, the valve mechanism (25) allows the plug member (21) to remain in the water tank (23), and allows the water supply control rod (22) comprised of the push-up member (22a) and the coupling member (22b) to be coupled to the water treatment vessel (10) rotatably supported in the reservoir (30).

<Humidification Rotor>

The humidification rotor (50) is comprised of a disc-shaped member made of water-absorptive nonwoven fabric, for example. The humidification rotor (50) is arranged such that a lower portion thereof is immersed in water stored in the reservoir (30) of the water treatment unit (40). Further, the humidification rotor (50) is configured to be driven to rotate by a driving motor (not shown).

<Fan>

The fan (60) is configured to suck the air in the room through the inlet (2), produce an air flow in the air passage (5), and blow the air into the room through the outlet (3). The fan (60) may be, for example, a sirocco fan.

—Operation Mechanism—

An operation mechanism of the air purifier (80) of the present embodiment will now be described below. In this air purifier (80), basically, the water treatment unit (40) performs a water purification operation, and the humidification rotor (50) performs a humidification operation with purified water while the air purification unit (45) purifies the air in the room.

<Water Purification Operation>

For the water purification operation, the reservoir (30) supporting the water treatment vessel (10), and the water tank (23) filled with tap water in advance are placed in the casing (1). Further, the high voltage generator (18) applies a predetermined voltage to the first and second electrodes (16) and (17).

When the reservoir (30) and the water tank (23) are placed, the water treatment vessel (10) in the reservoir (30) is tilted by its weight as shown in FIG. 4, and simultaneously, the water supply control rod (22) moves upward. As a result, the valve mechanism (25) is opened, and the water supplier (20) supplies water to the water treatment vessel (10). In this state, the water treatment vessel (10) is tilted. Thus, most of water supplied to the water treatment vessel (10) flows out of the water treatment vessel (10), and stored in the reservoir (30).

When the water is stored in the reservoir (30), the level of water in the reservoir (30) rises as shown in FIG. 5, and a buoyant force acts on the water treatment vessel (10). Thus, the water treatment vessel (10) rotates clockwise about the rotational shaft (S), thereby gradually reducing the amount of tilt of the water treatment vessel (10). As a result, water is gradually accumulated in the water treatment vessel (10).

As the amount of water stored in the reservoir (30) increases, the water treatment vessel (10) further rotates clockwise until the water treatment vessel (10) is maintained in a horizontal position. Thus, the water treatment vessel (10) and the reservoir (30) no longer communicate with each other. Then, the first and second electrodes (16) and (17) are immersed in the water stored in the water treatment vessel (10), thereby causing electric discharge in the water. In this state, the water treatment vessel (10) is switched from the draining state to the discharging state. When the water supply control rod (22) moves downward along with the rotation of the water treatment vessel (10), the valve mechanism (25) is closed, and the water supplier (20) stops the supply of water to the water treatment vessel (10).

When the first and second electrodes (16) and (17) are immersed in the water stored in the water treatment vessel (10), a current density of the current path formed by the through hole (12h) in the discharging member (12) of the divider (11) increases.

The increase in current density of the current path in the through hole (12h) increases Joule heat generated in the through hole (12h). As a result, water is vaporized inside, and around the openings, of the through hole (12h) of the discharging member (12), thereby forming a bubble (C) in the through hole (12h). This bubble (C) covers the entire region of the through hole (12h) as shown in FIG. 2. In this state, the bubble (C) functions as a resistance that inhibits conduction between the first and second electrodes (16) and (17) via water. Thus, the potential difference between the first and second electrodes (16) and (17) and water becomes almost zero, and an interface between the bubble (C) and water on one side of the divider (11) and an interface between the bubble (C) and water on the other side of the divider (11) serve as electrodes. Then, dielectric breakdown occurs in the bubble (C), thereby causing electric discharge.

If the electric discharge occurs in the bubble (C) in this manner, a sterilizing factor, such as hydroxyl radicals, is produced in the water stored in the water treatment vessel (10).

Further, if a humidification operation to be described later is performed, the amount of water in the reservoir (30) decreases to lower the level of water in the reservoir (30). Then, the water treatment vessel (10) is switched from the discharging state (see FIG. 6) to the draining state (see FIGS. 4 and 5). Moreover, if sterilized water is supplied from the water treatment vessel (10) to the reservoir (30) to raise the level of water in the reservoir (30), the water treatment vessel (10) is switched from the draining state (see FIGS. 4 and 5) to the discharging state (see FIG. 6). In this way, the water treatment vessel (10) rotates if the level of water in the reservoir (30) changes, and is automatically switched between the draining state (see FIGS. 4 and 5) and the discharging state (see FIG. 6).

In this manner, the water purification operation is performed. When the water treatment vessel (10) is switched from the discharging state to the draining state, sterilized water stored in the water treatment vessel (10) and containing the sterilizing factor is supplied to the reservoir (30), and the humidification operation is performed with the sterilized water.

<Humidification Operation>

During the humidification operation, the fan (60) is operated, and the humidification rotor (50) is driven to rotate by a driving motor. Further, a voltage is applied between the electrodes of the ionizer (42).

When the fan (60) is operated, the air in the room is introduced into the air passage (5) in the casing (1) through the inlet (2). The air introduced into the air passage (5) passes through the prefilter (41), during which some of dust particles are removed from the air, and further passes through the ionizer (42). The ionizer (42) causes corona discharge between the electrodes, thereby charging the dust particles in the air. The air that has passed through the ionizer (42) passes through the electrostatic filter (43). The electrostatic filter (43) electrically attracts and traps the dust particles charged by the ionizer (42). The air that has passed through the electrostatic filter (43) flows through the deodorizing filter (44). The deodorizing filter (44) removes target components (odor and toxic substances) from the air. The air that has passed through the deodorizing filter (44) passes through the humidification rotor (50).

Water stored in the reservoir (30) is absorbed on a rotor body of the humidification rotor (50). When the air passes through the humidification rotor (50), moisture adsorbed on the humidification rotor (50) is released in the air.

In this manner, the humidification operation is performed.

—Advantages of First Embodiment—

As can be seen, according to the air purifier (80) of the present embodiment, the water treatment vessel (10) is configured to move in accordance with the level of water stored in the reservoir (30) such that the water treatment vessel (10) is switched between the discharging state where electric discharge is caused in the water, and the draining state where the electric discharge does not occur.

While the water treatment vessel (10) is in the discharging state, the water treatment vessel (10) and the reservoir (30) have no communication, and the first and second electrodes (16) and (17) are immersed in water in the water treatment vessel (10) to cause electric discharge in the water. While the water treatment vessel (10) is in the discharging state, the water treatment vessel (10) and the reservoir (30) have no communication. Thus, water in the water treatment vessel (10) and water in the reservoir (30) are electrically insulated from each other, and thus no current flows from the water in the water treatment vessel (10) to the water in the reservoir (30).

While the water treatment vessel (10) is in the draining state, the first and second electrodes (16) and (17) fixed in the casing (1) come out of water in the water treatment vessel (10) to stop the electric discharge in the water, and the water flows out of the water treatment vessel (10) into the reservoir (30). While the water treatment vessel (10) is in the draining state, the water flows out of the water treatment vessel (10) into the reservoir (30), thereby bringing the water in the water treatment vessel (10) and the water in the reservoir (30) into conduction. However, no current flows from the water in the water treatment vessel (10) to the water in the reservoir (30) because the electrical discharge in the water in the water treatment vessel (10) has been stopped.

Thus, the insulting structure adjacent to the outlet of the water treatment vessel (10) functions in any of the discharging and draining states of the water treatment vessel (10), and is downsized as compared with a generally known insulating structure which drips water, for example.

The water supplier (20) is configured to supply water to the water treatment vessel (10) while the water treatment vessel (10) is in the draining state, and stop the supply of water to the water treatment vessel (10) while the water treatment vessel (10) is in the discharging state.

While the water treatment vessel (10) is in the discharging state, the water supplier (20) stops the supply of water to the water treatment vessel (10). Thus, water in the water treatment vessel (10) and water in the water supplier (20) are electrically insulated from each other, and no current flows from the water in the water treatment vessel (10) to the water in the water supplier (20).

While the water treatment vessel (10) is in the draining state, the water supplier (20) supplies water to the water treatment vessel (10), thereby bringing the water in the water treatment vessel (10) and the water in the water supplier (20) into conduction. However, no current flows from the water in the water treatment vessel (10) to the water in the water supplier (20) because the electric discharge in the water in the water treatment vessel (10) has been stopped.

Thus, the insulting structure adjacent to the inlet of the water treatment vessel (10) functions in any of the discharging and draining states of the water treatment vessel (10), and is downsized as compared with a generally known insulating structure which sprays water, for example.

Thus, the insulating structures adjacent to the inlet and outlet of the water treatment vessel (10) are reduced in size as compared with those of the above-described generally known water treatment device. This may downsize insulating structures adjacent to an inlet and outlet of a water treatment device which causes electric discharge in water.

Moreover, according to the air purifier (80) of the present embodiment, the water treatment vessel (10) is supported to be rotatable about the rotational shaft (S) parallel to the horizontal plane in the reservoir (30). Further, the water treatment vessel (10) is configured to rotate in accordance with the level of water stored in the reservoir (30) so as to be switched between the discharging and draining states. Specifically, the water treatment vessel (10) rotates about the rotational shaft (S) in the reservoir (30) to be switched between the discharging and draining states. Thus, the water treatment vessel (10) may be placed at a lower level as compared with the case, for example, where a generally known insulating structure which drips water is adopted.

Further, according to the air purifier (80) of the present embodiment, the water treatment vessel (10) includes a divider (11) which is made of an electrically insulating material, and functions as a partition between the first and second electrodes (16) and (17) immersed in water stored in the water treatment vessel (10). The discharging member (12) of the divider (11) has a through hole (12h) which forms a current path between the first and second electrodes (16) and (17) while the water treatment vessel (10) is in the discharging state. The divider (11) is orthogonal to the rotational shaft (S) of the water treatment vessel (10). Thus, when the water treatment vessel (10) rotates about the rotational shaft (S) orthogonal to the divider (11), the first and second electrodes (16) and (17) arranged to sandwich the divider (11) are immersed in water stored in the water treatment vessel (10), thereby switching the water treatment vessel (10) to the discharging state.

While the water treatment vessel (10) is in the discharging state, a bubble (C) is formed in the through hole (12h) penetrating the discharging member (12) to serve as the current path between the first and second electrodes (16) and (17), and electric discharge occurs in the bubble (C) in the water stored in the water treatment vessel (10). As a result, a sterilizing factor, such as hydroxyl radicals, may be produced in the water stored in the water treatment vessel (10).

Further, the divider (11) is orthogonal to the rotational shaft (S). Thus, the water treatment vessel (10), when tilted during the draining state, allows water to flow out of both of the portions of the water treatment vessel (10) divided by the divider (11).

In addition, according to the air purifier (80) of the present embodiment, the water supplier (20) includes a valve mechanism (25) coupled to the water treatment vessel (10) that rotates in the reservoir (30). The valve mechanism (25) is configured to be closed while the water treatment vessel (10) is in the discharging state, and opened while the water treatment vessel (10) is in the draining state, in accordance with the rotation of the water treatment vessel (10).

While the water treatment vessel (10) is in the discharging state, the valve mechanism (25) stops the supply of water from the water supplier (20) to the water treatment vessel (10). Thus, water in the water treatment vessel (10) and water in the water supplier (20) are electrically insulated from each other, and no current flows from the water in the water treatment vessel (10) to the water in the water supplier (20).

Further, while the water treatment vessel (10) is in the draining state, the valve mechanism (25) allows the water supplier (20) to supply water to the water treatment vessel (10), thereby bringing the water in the water treatment vessel (10) and the water in the water supplier (20) into conduction. However, no current flows from the water in the water treatment vessel (10) to the water in the water supplier (20) because the electric discharge in the water in the water treatment vessel (10) has been stopped.

Thus, the insulating structure adjacent to the inlet of the water treatment vessel (10) may be downsized because the insulating structure is comprised of the valve mechanism (25) of the water supplier (20).

Furthermore, according to the air purifier (80) of the present embodiment, the water treatment vessel (10) that rotates in the reservoir (30) is tilted and switched to the draining state if the level of the water stored in the reservoir (30) is equal to or less than a predetermined value. Thus, while the water treatment vessel (10) is in the draining state, the water flows out of the water treatment vessel (10) over an edge thereof into the reservoir (30). As a result, the water in the water treatment vessel (10) and the water in the reservoir (30) are brought into conduction. However, no current flows from the water in the water treatment vessel (10) to the water in the reservoir (30) because the discharge in the water in the water treatment vessel (10) has been stopped.

If the level of water in the reservoir (30) exceeds the predetermined value and the amount of tilt of the water treatment vessel (10) is reduced, the water treatment vessel (10) is switched to the discharging state. During this discharging state, the water stored in the water treatment vessel (10) does not flow into the reservoir (30), and the water treatment vessel (10) and the reservoir (30) have no communication. Thus, the water in the water treatment vessel (10) and the water in the reservoir (30) are electrically insulated from each other. Therefore, during the discharging state, no current flows from the water in the water treatment vessel (10) to the water in the reservoir (30).

Thus, the insulating structure adjacent to the outlet of the water treatment vessel (10) may be downsized because the insulating structure is comprised of the water treatment vessel (10) that rotates in the reservoir (30).

Further, according to the air purifier (80) of the present embodiment, the wall surface of the water treatment vessel (10), over which the water flows out of the water treatment vessel (10), is tilted so that an upper end of the wall surface is located further toward the outside than a lower end thereof. Thus, the water flows over a portion of the water treatment vessel (10) having the shape of the bow of a boat as viewed from the side (as viewed in the direction of the rotational shaft (S)). As a result, the wall surface may be well drained, while ensuring an insulation distance between the surface of the water in the reservoir (30) and the surface of the water in the water treatment vessel (10). Further, if water is stored in the reservoir (30), a buoyant force acts on the water treatment vessel (10) to float the bow-shaped portion of the water treatment vessel (10). This allows the water treatment vessel (10) to rotate in the reservoir (30).

Other Embodiments

In the first embodiment described above, the air purifier including the water treatment vessel (10) which causes electric discharge in water stored therein has been described. However, the present invention is also applicable to an air purifier including a water treatment vessel which causes electrolysis in water stored therein.

In the first embodiment described above, the air purifier (80) including the water treatment unit (40) has been described as an example of a water treatment device. However, the present invention is also applicable to a humidifier including a water treatment unit (40).

Note that the above-described embodiments are merely exemplary ones in nature, and do not intend to limit the scope, application or uses of the present invention.

INDUSTRIAL APPLICABILITY

As can be seen from the foregoing, the present invention is useful for a water treatment device which purifies water by causing electric discharge in water.

DESCRIPTION OF REFERENCE CHARACTERS

10 Water Treatment Vessel
11 Divider
12h Through Hole
16 First Electrode (One of a Pair of Electrodes)
17 Second Electrode (The Other of the Pair of Electrodes)
20 Water Supplier
25 Valve Mechanism
30 Reservoir
80 Air Purifier (Water Treatment Device)

The invention claimed is:

1. A water treatment device comprising:
   a water treatment vessel which causes electric discharge in water stored therein to produce a sterilizing factor;
   a water supplier, including a water tank and valve mechanism, which supplies water to the water treatment vessel;
   a reservoir which stores the water supplied from the water supplier; and
   a pair of electrodes which cause the electric discharge in the water treatment vessel, wherein
   the water treatment vessel is configured to rotate, about a rotational shaft parallel to a horizontal plane in the reservoir, in accordance with the level of the water stored in the reservoir,
   rotation of the water treatment vessel switches the water treatment vessel between a discharging state where the water treatment vessel and the reservoir have no communication and the pair of electrodes are immersed in the water in the water treatment vessel to cause the electric discharge, and a draining state where the pair of electrodes come out of the water in the water treatment vessel to stop the electric discharge and the water flows out of the water treatment vessel into the reservoir, and
   the water supplier is configured to supply water to the water treatment vessel while the water treatment vessel is in the draining state, and stop the supply of water to the water treatment vessel while the water treatment vessel is in the discharging state.

2. The water treatment device of claim 1, wherein
   the water treatment vessel includes a divider which is made of an electrically insulating material, and divides a space in the water treatment vessel into a portion in which one of the pair of electrodes is immersed in the water, and a portion in which the other of the pair of electrodes is immersed in the water, the divider has a through hole which forms a current path between the pair of electrodes and allows the electric discharge to occur, and the divider is orthogonal to the rotational shaft of the water treatment vessel.

3. The water treatment device of claim 1, wherein the valve mechanism is coupled to the water treatment vessel, and is configured to be closed during the discharging state, and opened during the draining state.

4. The water treatment device of claim 1, wherein the water treatment vessel is configured to be switched to the draining state if the level of the water stored in the reservoir is equal to or less than a predetermined value, and tilted in the draining state such that the water flows out of the water treatment vessel over an edge thereof reservoir into the reservoir.

5. The water treatment device of claim 1, wherein a wall surface of the water treatment vessel, over which the water flows out of the water treatment vessel, is tilted so that an upper end of the wall surface is located further toward the outside than a lower end thereof.

6. The water treatment device of claim 2, wherein valve mechanism is coupled to the water treatment vessel, and is configured to be closed during the discharging state, and opened during the draining state.

7. The water treatment device of claim 2, wherein the water treatment vessel is configured to be switched to the draining state if the level of the water stored in the reservoir is equal to or less than a predetermined value, and tilted in the draining state such that the water flows out of the water treatment vessel over an edge thereof reservoir into the reservoir.

8. The water treatment device of claim 2, wherein a wall surface of the water treatment vessel, over which the water flows out of the water treatment vessel, is tilted so that an upper end of the wall surface is located further toward the outside than a lower end thereof.

9. The water treatment device of claim 3, wherein a wall surface of the water treatment vessel, over which the water flows out of the water treatment vessel, is tilted so that an upper end of the wall surface is located further toward the outside than a lower end thereof.

10. The water treatment device of claim 4, wherein a wall surface of the water treatment vessel, over which the water flows out of the water treatment vessel, is tilted so that an upper end of the wall surface is located further toward the outside than a lower end thereof.

11. The water treatment device of claim 6, wherein a wall surface of the water treatment vessel, over which the water flows out of the water treatment vessel, is tilted so that an upper end of the wall surface is located further toward the outside than a lower end thereof.

12. The water treatment device of claim 7, wherein a wall surface of the water treatment vessel, over which the water flows out of the water treatment vessel, is tilted so that an upper end of the wall surface is located further toward the outside than a lower end thereof.

* * * * *